Patented Dec. 13, 1949

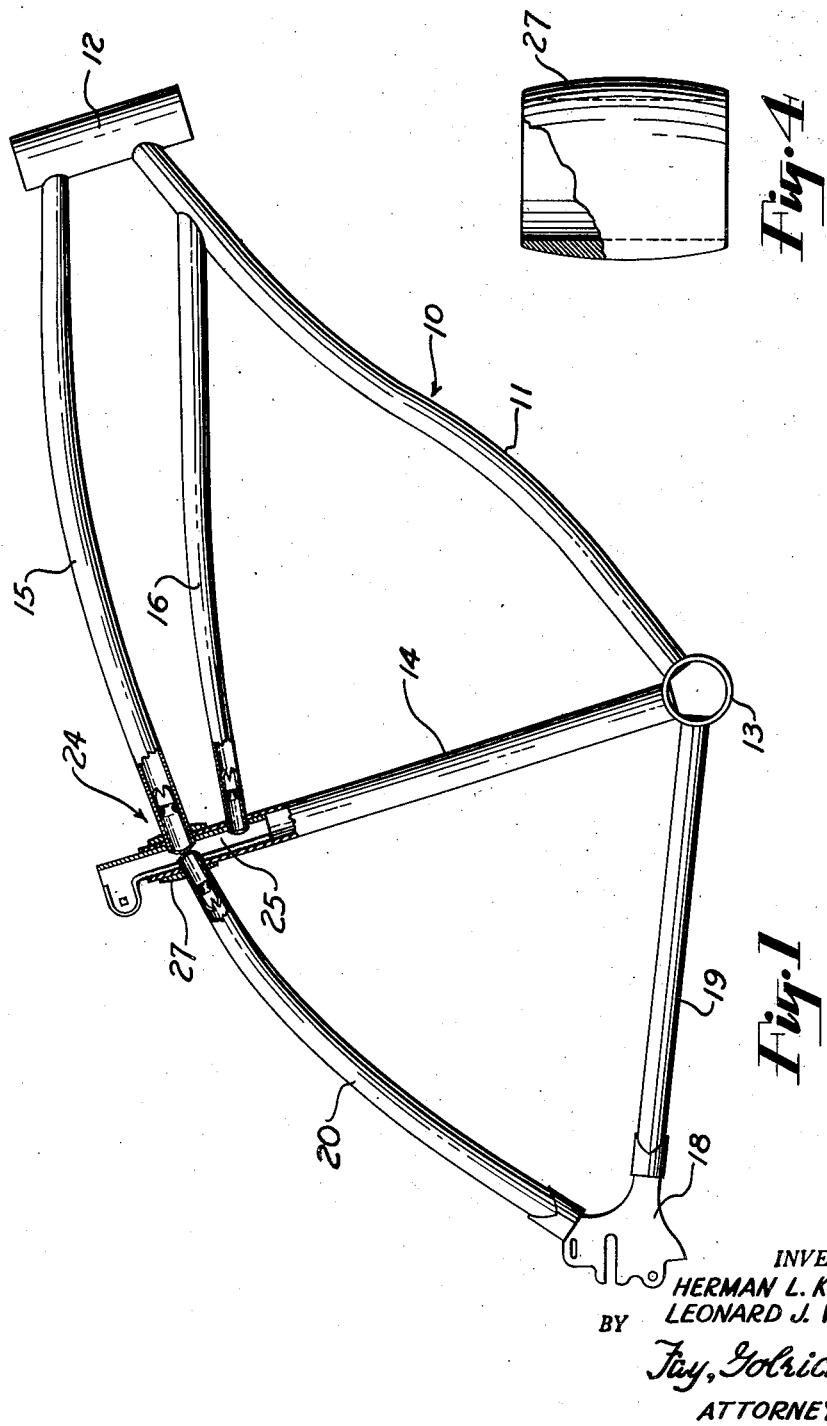

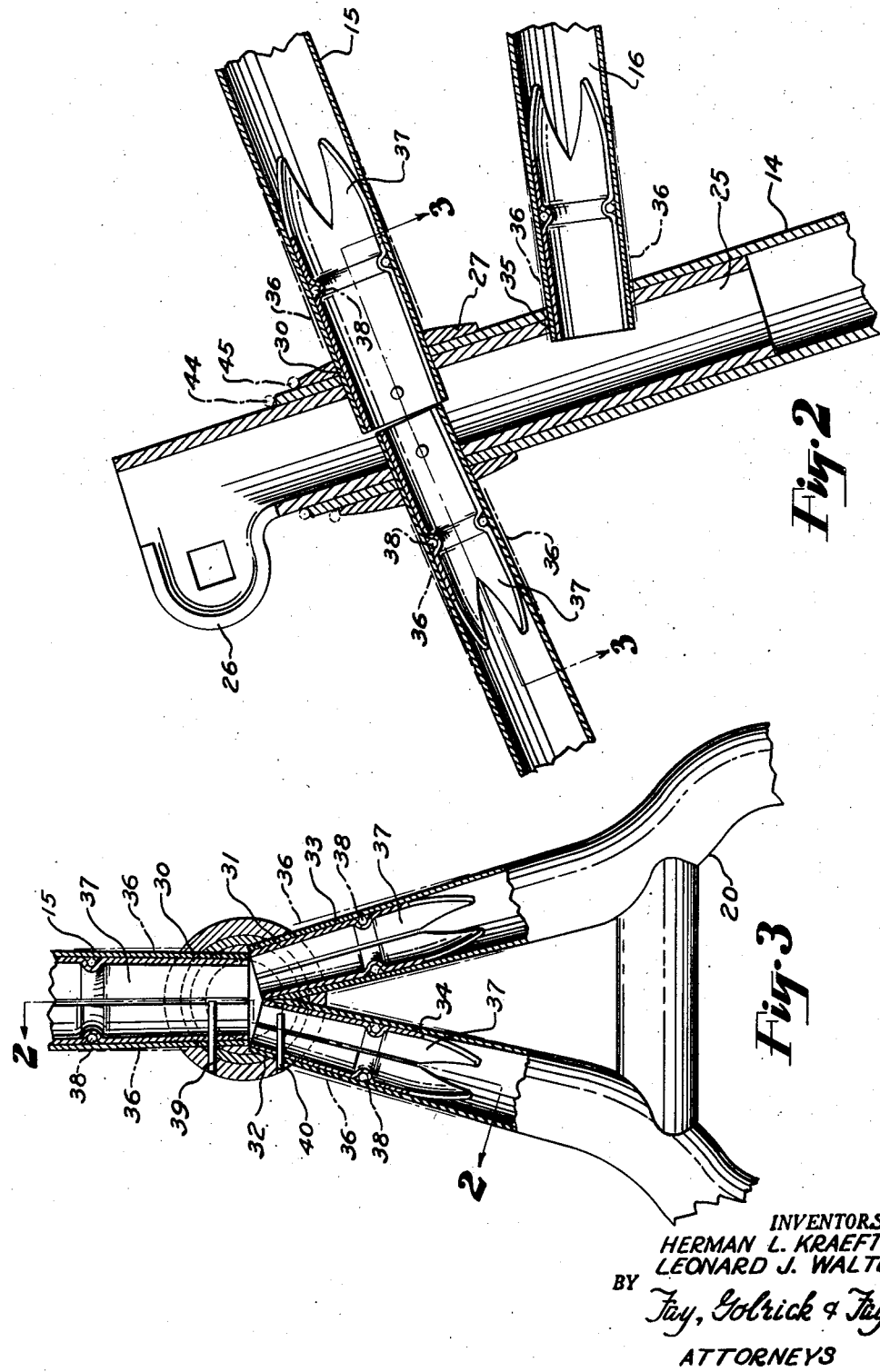

2,491,379

UNITED STATES PATENT OFFICE 2,491,379

SEAT POST CLUSTER STRUCTURE FOR BICYCLES

Herman L. Kraeft, Cleveland Heights, and Leonard J. Walters, Shaker Heights, Ohio, assignors to The Murray-Ohio Manufacturing Company, Cleveland, Ohio, a corporation of Ohio Application March 12, 1947, Serial No. 734,120

4 Claims. (Cl. 287—54)

1

This invention is directed to a seat post cluster structure for bicycle frames and a method of forming the same and comprises an improvement over the structure shown in our prior application Serial No. 576,932, filed Feb. 19, 1945, now Patent No. 2,443,008.

In our prior application we have disclosed a method of constructing a bicycle frame by having the various reach bars or tubular sections preassembled in a press fitted manner whereby all of the tubular joints of the frame may be copper brazed simultaneously by passing the same through a hydrogen furnace. The present invention is concerned with the obtaining of a more rigid pre-assembly of the tubular ends joined with the seat post mast tube whereby the preassembled relation of all of the tubular members comprising the frame will be maintained accurately when the entire frame is subjected to the comparatively high temperatures necessary to effect an efficient copper brazing of the joints. This cluster structure is such that during the final preassembly of the entire frame it exerts a final locking action which prevents any relative creeping or slipping of the several tubular sections comprising the frame during such a brazing operation. In our prior patent we proposed to form a branched cluster member or bracket, the branches of which were formed to receive the ends of the upper forward reach bar and the ends of the upper rear fork members. While such a structure, with due care in making, proved to be satisfactory, nevertheless, inaccuracies and variation in production at times introduced uncertainties which we have eliminated by the present disclosed structure and method of final formation thereof.

The general object of the present invention accordingly is to provide an improved tubular joint comprising the seat post cluster structure of a copper brazed bicycle frame which will be sufficiently rigid and accurate in preassembled condition and during the brazing operation to maintain the frame members in proper position when subjected to from 1980° to 2020° F.

A further object of the present invention is the provision of a seat post cluster structure for a bicycle frame which can be made by the copper brazing method and which will have inherent strength, but minimum bulk appearance in the final product.

Other objects and advantages of the invention will be apparent from the following description of a preferred form of the invention, reference being made to the accompanying drawings wherein;

Fig. 1 is a view in elevation of a bicycle frame, certain parts being broken away to show the interior thereof;

Fig. 2 is a view in section of the seat post structure of the frame, the view being on a larger scale than in Fig. 1;

Fig. 3 is a view in section taken substantially on line 3—3 of Fig. 2; and,

Fig. 4 is a view of a reinforcing collar.

The present invention relates to a seat post structure and method of making the same, which structure is incorporated in a tubular frame bicycle such as that indicated at 10 in the drawings. The frame consists of a lower reach bar 11 connected at one end to a tubular housing 12 and at the opposite end to a hangar housing 13, the housing 12 being adapted to support the front wheel structure of the bicycle and the housing 13 forming a journal for the sprocket bearing. A seat post reach bar 14 extends upwardly from the housing 13 and a top reach bar 15 interconnects the bar 14 with the housing 12. A second upper reach bar 16 interconnects the reach bar 14 and bar 11. A pair of rear yokes 18 are supported by a lower fork member 19 and an upper fork member 20, which members are connected to the yokes 18 and to the housing 13 and bar 14, respectively. The rear wheel of the bicycle is mounted to the rear yokes.

A preferred method of forming the frame 10 is to assemble the various bars and housings in the form shown by interconnecting the various frame members with more or less press fits and with brazing metal located adjacent to the junctures of the members. This assembly is referred to as a "preassembly," and then the entire preassembled frame is placed in a hydrogen furnace where the temperature of the frame is brought up to that at which the brazing metal will melt and flow between the abutting surfaces of the various frame members so that when the frame is removed from the furnace, the brazing metal on cooling will rigidly bond the various members into an integral unit. The brazing metal is generally copper and, therefore, the temperature in the furnace must be from 1980 to 2020° F. This high temperature produces stresses on the frame, and its is therefore essential that in the preassembly of the frame structure, the joints must be secured with sufficient coherence to prevent distortion of the frame as the temperature thereof increases to that necessary for brazing. Generally the frame structure is finally locked together at the seat post assembly, which is indicated generally at 24, and it is essential that this portion of the frame structure be rigidly connected in the preassembly.

Our invention is directed to an improved seat post structure and method of forming the same whereby the requisite preassembled rigidity is provided and which structure may be readily assembled with a minimum of simple elements.

Referring more particularly to the structure shown in Figs. 2 and 3, a sheath-like seat post receiving member 25 is telescoped into the upper end of the reach bar 14. The member 25 may be formed of a sheet metal stamping folded in a tubular form. The stamping is made with two ears or lugs at one end and on opposite sides so that when the member is folded the two lugs, one of which is shown at 26, will extend parallel and adjacent to one another for receiving a clamping bolt by which the upper end of member 25 may be contracted to tightly grip the post of the bicycle seat (not shown) telescoped into the member 25 for positioning the elevation of the seat. A reinforcing collar 27 is concentrically positioned about the bar 14 and sheath 25 with its upper edge slightly below the upper end of the bar 14. A tapered radially extending opening 30 is drilled through the collar, bar and sheath for receiving the end of the upper reach bar 15 and two similar radially extending tapered bores 31 and 32 are drilled through the collar, bar 14 and sheath 25 for receiving the two branches 33 and 34, respectively, of the rear fork 20. The bar 14 and sheath 25 have a tapered opening 35 drilled therein for the reception of the end of reach bar 16. The ends of the reach bars 15 and 16, and the branches 33 and 34 are swaged as is indicated by the broken lines 36 so that these members may be easily inserted into the tapered bores 30, 31, 32 and 35, respectively, and wedged into the openings for forming a tight press fit therewith, preferably having a clearance of between —.002 and —.005". The terminal parts of the swaged ends of the tubes 15, 16, 33 and 34 may be straight and the complementary or receiving bores straight and with the minus clearances specified. Preferably, the reach bars 15 and 16 and the branches 33 and 34 are provided with reinforcing members 37, which members are provided with grooves for receiving rings of brazing metal 38. In the preassembly of the frame the seat post structure is assembled last, and it will be understood that the collar 27 will be placed on bar 14 prior to the telescoping of sheath 25 into bar 14. The collar 27 may fit snugly to the bar 14 and the openings 30, 31 and 32 are drilled with the collar in place.

In most instances, the press fit of the bars 15 and 16 and branches 33 and 34 will hold the frame in its preassembled form during the brazing operation, but in order to assure such holding the frame members 15, 33 and 34 are locked in place. This lock is accomplished by drilling two relatively small openings through the collar 27, bar 14 and sheath 25 and through the walls of the frame members 15 and 34 respectively, and pins 39 and 40 are driven into these openings whereby the frame members are mechanically locked to the reach bar 14.

Before the frame is placed in the brazing furnace rings of copper are placed about the upper end of the bar 14 and about the upper edge of collar 27. These rings are shown in broken lines at 44 and 45, respectively. The frame is then placed in the furnace and heated to the proper temperature for melting the rings 44 and 45 and the melted copper of ring 44 will flow between the sheath 25 and bar 14 and between the walls of the openings 30, 31, 32 and 35, and the abutting surfaces of the members in the respective openings. Thus, film of brazing metal will be extended, by capillary traction, between the adjacent surfaces of the bar 14 and sheath 25 and also between the walls of the radial openings and the ends of the frame members 15, 16, 33 and 34. Likewise, the metal from ring 45 will flow between the abutting surfaces of the collar 27 and bar 14 and between the walls of the openings 30, 31 and 32 and the abutting surfaces of the respective frame members. When the frame is cooled the brazing metal will have formed a firm bond between the members comprising the seat post structure, and by proper selection of the size of the rings 44 and 45, little, if any, brazing metal will be present on the exterior of the structure. This eliminates the necessity of cleaning of the structure of excess metal, and a clean appearance in the final structure is inherent.

By brazing the end of bar 16 into the opening 35, the bar 16 is firmly secured in place and its position is positively maintained during the heating of the frame.

After the brazing operation the inner ends of the bars 15 and 16, and the branches 33 and 34, together with the pins 39 and 40, may be removed by inserting a drill into the seat post sheath 25 so that the sheath will be clear to receive the seat post.

It will be apparent that by our invention the bar 15 and fork member 20 will be rigidly attached to the reach bar 14 by a strong connection and the parts for effecting this connection are few and easily formed so that extreme care and time is not necessary for obtaining a sturdy and neat appearing structure.

It is to be understood that although we have described but one form of the invention, other forms might be used, all falling within the scope of the claims which follow.

We claim:

1. A seat post cluster structure for a bicycle frame comprising a seat post mast tube, a tube-like seat post sheath telescoped into the upper end of the seat post mast, a reinforcing collar on the outside of and embracing the upper portion of the tubular mast at the cluster structure, said collar, mast and sheath having two independently formed openings extending therethrough for the reception of tubular upper rear fork ends and a generally opposite similar opening formed for the reception of an end of a front upper reach bar tube, upper rear fork tubes having ends independently extending into the fork tube openings of the collar and the mast and the sheath and a reach bar tube end extending into the other opening of the collar and the mast and the sheath whereby all of said tube ends are connected to the walls of the sheath, the mast and the collar and a copper brazed connection formed between all of the contacting surfaces of said tube ends and said three members.

2. A seat post cluster structure for a bicycle frame comprising a seat post mast tube, a tube-like seat post sheath telescoped into the upper end of the seat post mast, a reinforcing collar on the outside of and embracing the upper portion of the tubular mast at the cluster, said collar, mast and sheath having tapered openings extending therethrough for the reception of a tubular upper rear fork structure and for the reception of an end of a front upper reach bar tube, tapered tube ends extending into said tapered openings whereby the tapered tube ends are in a wedged connecting relation to the collar and the mast and the sheath and a copper brazed connection formed between all of the contacting surfaces of said tube ends and said three members and between the contacting surfaces of the three members relative to each other.

3. A seat post cluster structure for a bicycle frame comprising a seat post mast tube, a tube-like seat post sheath telescoped into the upper end of the seat post mast, a reinforcing collar on the outside of and embracing the upper portion of the tubular mast at the cluster structure, said collar, mast and sheath having two independently formed openings extending therethrough for the reception of tubular upper rear fork ends and a generally opposite similar opening formed for the reception of an end of a front upper reach bar tube and all of said openings being tapered, upper rear fork tubes having tapered ends independently extending into the tapered fork tube openings of the collar and the mast and the sheath and a tapered reach bar tube end extending into the other opening of the collar and the mast and the sheath whereby all of said tube ends are connected to the walls of the sheath, the mast and the collar and a copper brazed connection formed between all of the contacting surfaces of said tube ends and said three members.

4. A seat post cluster structure for a bicycle frame comprising a seat post mast tube, a tube-like seat post sheath telescoped into the upper end of the seat post mast, a reinforcing collar on the outside of and embracing the upper portion of the tubular mast at the cluster, said collar, mast and sheath having two independently formed openings extending therethrough for the reception of tubular upper rear fork ends and a generally opposite similar opening formed for the reception of an end of a front upper reach bar tube, said sheath extending downwardly within the mast a considerable distance below said three openings, upper rear fork tubes having ends independently extending into the fork tube openings of the collar and the mast and the sheath, an upper front reach bar tube end extending into the other opening of the collar and the mast and the sheath and a second front reach bar tube having an end thereof extending through an opening formed in the mast and sheath walls below the cluster structure whereby all of the top tube ends are connected to the walls of the sheath, the mast and the collar and the fourth tube end is connected to the sheath and mast walls and a copper brazed connection formed between all of the contacting surfaces of said tube ends and the mast and sheath structures.

HERMAN L. KRAEFT.
LEONARD J. WALTERS.

REFERENCES CITED

The following references are of record in the file of this patent:

UNITED STATES PATENTS

| Number | Name | Date |
|---|---|---|
| 548,165 | Lavender | Oct. 15, 1895 |
| 571,289 | Shultz | Nov. 10, 1896 |
| 590,307 | Finley | Sept. 21, 1897 |
| 623,495 | Trebert | Apr. 18, 1899 |
| 736,527 | Latta | Aug. 18, 1903 |
| 1,480,777 | Meiselbach | Jan. 15, 1924 |
| 2,253,857 | Hedstrom | Aug. 26, 1941 |

FOREIGN PATENTS

| Number | Country | Date |
|---|---|---|
| 13,100 | Great Britain | July 5, 1893 |
| 425,133 | Great Britain | Mar. 7, 1935 |

OTHER REFERENCES

Schmidt "Copper Furnace Brazed Parts and Principles of Design" Product Engineering, October 1946, pp. 103–107. Copy in 113–112 Lit.

DeDomenico "How Brazing Methods Affect Design of Details" Product Engineering, April 1948, pp. 86–91. Copy in 113–112 Lit.

Tylecate "The Mechanical Properties and Some Metallurgical Features of Copper Brazed Joints" Welding Journal, April 1946, pp. 242–248. Copy in 113–112 Lit.